(12) United States Patent
Miceli

(10) Patent No.: US 10,687,537 B2
(45) Date of Patent: Jun. 23, 2020

(54) PIZZA DOUGH PRESS APPARATUS AND METHOD

(71) Applicant: Jeff Miceli, Denver, CO (US)

(72) Inventor: Jeff Miceli, Denver, CO (US)

(73) Assignee: MHI Restaurant Group LLC, Denver, CO (US)

( * ) Notice: Subject to any disclaimer, the term of this patent is extended or adjusted under 35 U.S.C. 154(b) by 84 days.

(21) Appl. No.: 15/993,592

(22) Filed: May 31, 2018

(65) Prior Publication Data

US 2018/0343875 A1    Dec. 6, 2018

Related U.S. Application Data

(60) Provisional application No. 62/513,243, filed on May 31, 2017.

(51) Int. Cl.
*A21C 11/00* (2006.01)

(52) U.S. Cl.
CPC .................. *A21C 11/006* (2013.01)

(58) Field of Classification Search
CPC .............................. A21C 11/006; A21D 13/00
See application file for complete search history.

(56) References Cited

U.S. PATENT DOCUMENTS

| | | | |
|---|---|---|---|
| 4,696,823 A | 9/1987 | DeChristopher | |
| 5,074,778 A | 12/1991 | Betts, Jr. et al. | |
| 5,176,922 A | 1/1993 | Balsano | |
| 5,297,947 A * | 3/1994 | Cardinali | A21C 11/08 425/194 |
| 5,387,149 A * | 2/1995 | Caveza | A21C 9/06 100/137 |
| 5,417,149 A * | 5/1995 | Raio | A21B 5/00 100/319 |
| 5,417,989 A * | 5/1995 | Atwood | A21C 11/006 426/27 |
| 5,469,779 A | 11/1995 | Amore et al. | |
| D376,466 S | 12/1996 | Ricke et al. | |
| 5,601,012 A * | 2/1997 | Ellner | A21B 3/133 99/428 |
| 5,716,658 A | 2/1998 | Donnelly et al. | |
| 6,048,191 A | 4/2000 | Beltrami | |
| 6,067,897 A | 5/2000 | Grieco | |
| 6,242,027 B1 | 6/2001 | Grieco | |
| 6,327,968 B1 | 12/2001 | Scannell | |
| 6,398,539 B1 | 6/2002 | Lawrence | |
| 6,629,493 B1 | 10/2003 | Schaible, II et al. | |
| 6,769,898 B1 | 8/2004 | Voyatzakis et al. | |
| 7,140,864 B1 | 11/2006 | McCarney | |
| D546,639 S | 7/2007 | Minidis | |

(Continued)

*Primary Examiner* — Nahida Sultana
(74) *Attorney, Agent, or Firm* — Bret Adams

(57) ABSTRACT

The present disclosure is directed to press systems and methods for forming pliable material, such as dough, into a specifically-designed shape for allowing hand-stretching of the pliable material after pressed by the press system. In some examples, the press system may be manually operated, automatically or hydraulically assisted, and/or mechanically assisted. The press assembly of the press systems disclosed herein may include a press mold having a contoured or multifaceted shape designed to form a finished dough, such as a pizza crust, having a thicker central portion, a relatively thinned intermediate portion, and a thicker edge portion at a perimeter of the pizza crust.

19 Claims, 6 Drawing Sheets

(56) References Cited

U.S. PATENT DOCUMENTS

| | | | |
|---|---|---|---|
| 8,366,433 B2* | 2/2013 | Chatel | B29C 48/30 425/376.1 |
| 8,689,685 B2 | 4/2014 | Lawrence | |
| 9,149,046 B2 | 10/2015 | McCarney | |
| 2006/0222748 A1* | 10/2006 | Kobayashi | A21C 3/02 426/502 |
| 2007/0042085 A1* | 2/2007 | Haas | A21D 8/06 426/94 |
| 2007/0178198 A1* | 8/2007 | Lichtenstein | A21C 11/006 426/138 |
| 2013/0224351 A1* | 8/2013 | Maragno | A21C 9/065 426/281 |
| 2015/0056336 A1 | 2/2015 | Fahey-Burke et al. | |
| 2015/0147435 A1 | 5/2015 | Rettey et al. | |
| 2019/0191722 A1* | 6/2019 | Sonnichsen | A21C 11/006 |

* cited by examiner

PIZZA DOUGH PRESS APPARATUS AND METHOD

CROSS-REFERENCE TO RELATED APPLICATIONS

The present application is a non-provisional of U.S. Provisional Patent Application Ser. No. 62/513,243 titled "PIZZA DOUGH PRESS APPARATUS AND METHOD", filed 31 May 2017, which is incorporated herein as if set out in full.

FIELD OF THE INVENTION

The present invention relates generally to the field of shaping a pliable material. More specifically, certain examples of the present invention relate to the shaping of pizza dough into a crust before baking.

BACKGROUND

The present invention relates to manufacturing or preparing pizza. Pizza dough typically consists of flour, sugar, yeast, salt, water, and/or oil, among various other ingredients that may be used to obtain desired characteristics. Pizza dough may be formed into a desired shape to form a pizza crust before being topped with other ingredients and baked. Notably, the term "crust" as used herein generally refers to the dough-based, breaded portion of a pizza and may refer to the baked or raw bottom of a pizza, rim of a pizza, or both.

There are various styles of pizzas, pizza doughs, and pizza crusts, each having characteristics which may be associated with certain geographic regions, cultures, traditions, etc. For example, common pizza styles include but are not limited to: Neapolitan, deep-dish, Chicago, New York, New England Greek, grilled, stuffed, cast iron, flatbread, cracker, St. Louis, Romana, Sicilian, Detroit, etc. Each style of pizza may be associated with one or more methods or procedures for preparing a crust consistent with the style. Doughs may be prepared with various moisture contents which yields a desired crust depending on the type of pizza being prepared. There are many known methods for shaping pizza dough prior to cooking. For example, pizza dough may be hand-tossed (i.e., manually spun in the air), hand-formed (e.g., shaped manually with a user's hands or tools), hand-stretched, rolled (e.g., with a rolling pin), sheeted (e.g., processed through a sheeter), pressed (e.g., manually or automatically smashed by a press, either unrestricted laterally or in a mold), etc.

Hand-prepared and hand-stretched crust may yield the a very desirable baked crust consistency. This is due to the reduced degassing of the dough when hand-stretching as opposed to pressing and rolling with a machine, kitchen tools, and the like. After dough is prepared, it is "proofed" which allows the yeast in the dough to ferment. This may also be referred to as allowing the dough to "rise." The yeast in the dough produces carbon dioxide bubbles within the dough which can lead to a lighter, fluffier crust when baked. However, when a machine or roller is used to flatten the dough into a pizza or crust form, the pressure of the rolling pin or press surface can lead to degassing of these air bubbles (which are primarily carbon dioxide), and the final product will be denser, crumby, with a uniform texture which may take on a more cracker-like consistency or texture. When hand-preparing and hand-stretching dough, however, the bubbles resulting from the fermentation and proofing process are retained in the dough, which when baked will lead to a fluffier, lighter, and softer dough.

However, hand-stretching dough is a skill which is learned and honed over time, and hand-stretching dough from a dough ball to a formed pizza crust often leads to sections in the dough which are very thin and prone to tearing. This can require starting the forming process over with a new dough ball, leading to additional time and costs. When preparing many pizza crusts for a restaurant and/or mass-production, it is important to be able to form many pizza crusts in a short period of time to reduce wait time, improve consistency, and maximize customer satisfaction.

A problem with many, if not all, of the above-mentioned methods and procedures is that they tend to yield a central portion of a base portion of a pizza crust which is undesirably thin, thereby leading to breaking and tearing of the dough during preparation. Therefore, a need exists for a method and apparatus for forming pizza dough into a shape that has a central portion which resists unwanted breaking and tearing, and ensures consistent pizza crust formation ready for hand-stretching even by novice users.

SUMMARY

In an aspect of the present disclosure is directed to a press system configured for pressing a pliable material, comprising a press assembly comprising a press mold comprising a central portion having a first dimension, an edge portion having a second dimension, and an intermediate portion having a third dimension and comprising a first angled surface and a second angled surface, wherein the first angled surface is inclined at a first angle with respect to a horizontal plane and the second angled surface is inclined at a second angle with respect to the horizontal plane; an expansion cavity defined by the central portion configured to receive at least a portion of the pliable material when the press system impinges the pliable material; wherein the intermediate portion is provided radially between the central portion and the edge portion, and the third dimension is greater than the first and second dimensions.

In another aspect of the present disclosure is directed to a method of molding a dough using a press assembly, comprising: placing the dough in a pan; placing the press assembly into the pan, wherein the dough is disposed between a bottom interior surface of the pan and the press assembly, the press assembly comprising a press mold including a first angled surface inclined at a first angle, a second angled surface inclined at a second angle, wherein the first and second angled surfaces are provided at an intermediate portion between a central portion and an edge portion of the press mold; applying a force to the press assembly in the direction of the bottom interior surface, wherein the application of force causes the first angled surface to force a portion of the dough toward an expansion cavity provided at the central portion of the press mold; retracting the press assembly from the pan, wherein the dough has a first thickness at a central portion that is greater than a second thickness of an adjacent portion circumscribing the central portion after retracting the press assembly.

DETAILED DESCRIPTION

Figure 1:
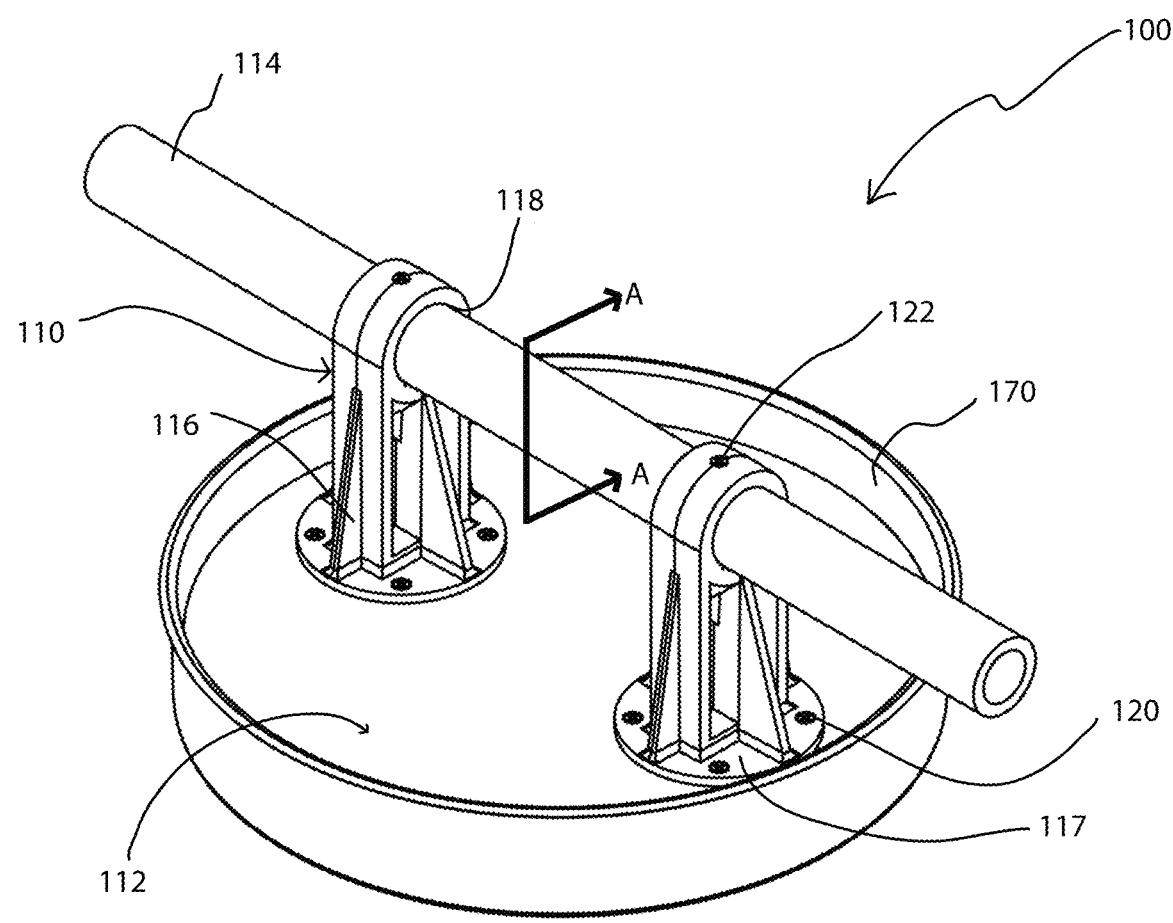
FIG. 1 is a perspective view of a press system according to a first example.

The following description is not intended to limit the invention to the forms disclosed herein. Consequently, variations and modifications commensurate with the following teachings, skill and knowledge of the relevant art, are within the scope of the present invention. The embodiments and examples described herein are further intended to explain modes of practicing the invention and to enable personas skilled in the art to make and utilize the embodiments or examples described herein, with or without various modifications required by the particular application(s) or use(s) of the present disclosure.

The present disclosure is directed to an apparatus and associated method for forming a ball of dough into a shape that allows further shaping and stretching of said dough by hand. The press and mold according to examples of the present disclosure are designed to form a dough which, when later hand-stretched, reduces or eliminates tearing or breaking in a central or an intermediate portion by providing a sufficient thickness in the central region of the dough to prevent it from becoming overly thinned when hand-stretched. Notably, although discussed in the context of pizza dough, the present invention is applicable to other types of dough as well as other pliable materials (e.g., putty, elastomers, pie crust, non-edible training or play dough, hamburger, tortilla, and the like). Regardless of the pliable material, aspects of the present invention are useful to form a reserve of material which may allow for greater lateral stretching without breakage. Additionally, although discussed in relation to a generally round or circular shape, the principles herein are similarly applicable to other shapes such as squares, rectangles, and the like.

Prior art methods of forming pizza dough often require multiple steps. Hand-tossing and hand-stretching require a significant amount of skill which may be associated with relatively high labor costs, production time, reduced consistency of the final product, and the like. Additionally, it often takes a substantial period of time for a user to be trained and proficient at the skill of hand-stretching pizza to reduce the incidence of tearing the dough. Tearing the dough, often caused by overly thinning a non-edge central or intermediate portion of the dough, may require starting a new dough ball or the expenditure of additional time to start the forming process over. Therefore, an alternative method may involve feeding a ball of dough through a sheeter or press to form a generally circular shape (which has a diameter smaller than the desired finished product) which may then more easily be finished by hand or with other tools. However, sheeters and presses, if not used correctly and designed with hand-stretching in mind, may create a substantially uniform thickness throughout the crust, which when later hand-stretched may cause tearing or undesirable thinning of the dough.

In some instances in which a press is configured to form a raised edge crust, the thickness is substantially uniform and thin throughout the base (or central portion) of the crust with an increased thickness provided only around the perimeter edge of the crust. In either case, prior art methods create a central portion of the base of the crust with a thickness equal to an outer portion of the base of the crust. It is noted that the term "base of the crust" as used in the present disclosure refers to the substantially flat portion within (or central to) a raised outer edge (if such a raised outer edge is present or provided). Due to the substantially uniform thinness in the central region, subsequent stretching of the dough by hand tends to cause thinning of the crust in the central portion of the base, causing unwanted tearing and breakage or yielding a crust that, when baked, is insufficient to maintain a proper shape of the pizza or slice of pizza. This undesirable thinning of the crust is especially common to users who are new to the art of hand-stretching pizza, such as new trainees at a restaurant. Even after experience, this skill can take a long period of time to master. Additionally, the consistency of the dough, which may be factor of the moisture content of the dough, may present significant resistance to being formed. If a user is not sufficiently strong or cannot apply a sufficient amount of force or weight to the dough, forming of the dough can be incomplete or take a tedious amount of time. This may slow down operation of a restaurant kitchen or produce inconsistent resulting dough shapes, which in turn leads to a potentially inferior product when baked, an undesired dough texture, baked consistency, and/or may result in unsatisfied customers.

In one example of the present disclosure, a press may include a means for retaining a greater thickness at a central portion of the base of the crust. Such means may comprise an expansion cavity or recess defined in a press mold face configured allow additional dough material to accumulate in the expansion cavity as the press is applied to the dough. In this regard, one or more beveled edges (e.g., surfaces angled at one or more angles $\Theta$ relative to a horizontal or "flat" plane), provided adjacent to the expansion cavity, may comprise a surface disposed at an angle such that the one or more beveled edges forces at least a portion of the dough inward into the expansion cavity. A press mold face or surface, which makes contact with the pliable material such as a dough, may be substantially planar or may be sloped. In a preferred example, the press mold face includes a surface angled at a first angle and a second surface on the press mold face angled at a second angle, as will be discussed below with respect to the figures. These angles may be selected to ensure a sufficient amount of dough is forced into the central expansion cavity to allow hand-stretching after pressing, while also forming a raised perimeter edge. The first and second angles $\Theta_1$, $\Theta_2$ may also be selected or optimized for specific dough moisture contents, which corresponds to different elasticities and stiffness of the dough and which therefore may make it more difficult to form in the press (e.g., a lower moisture content may resist forming or pressing more than a higher moisture content, and therefore the angles $\Theta_1$, $\Theta_2$ may be smaller angles for dough with a higher moisture content than the angles $\Theta_1$, $\Theta_2$ for angled surfaces used with lower moisture-content dough). Another factor which may make a dough more or less pliable is the length of time the dough has been proofed. Typically, a dough which has been proofed for a longer period of time will require less force to mold the dough, and therefore the one or more angled surfaces may include angles which are shallower, or smaller, than angled surfaces for use with a stiffer, less pliable dough. In other examples, the press surface as discussed herein may refer to a surface including flat surface, an angular surface, a faceted surface, a curved surface, or a combination of these surface types.

An expansion cavity may have a cavity ceiling (e.g., disposed on a bottom surface of a plate member positioned above the base member) which limits the volume of dough which may enter the expansion cavity. In some examples the expansion cavity have an open top without a "ceiling." Optionally, a lid member may be disposed upon a plate member on a side of the plate member opposite the base member. Such a lid member may be sized for receipt within a pan in manner to aid in the formation of a raised edge crust (in which case, a maximum diameter or width of the lid member may define a reference width) and/or a lid member may be sized larger than a pan to form a lid which prevents dough from overflowing from the pan while under compression (in which case a maximum diameter or width of an outer edge of a plate member may define a "reference width").

Various widths and diameters for each component or surface may be used to obtain desired results. For example, a base surface may have an outer width (adjacent a beveled edge or angled surface if present) that is approximately 60-99% of the reference width described above and an inner width defining the opening that is approximately 50-95% of the reference width. A surface of the first beveled edge (connecting an inner edge of a base surface to a cavity wall) may have an inner width that is approximately 30-80% of the reference width. A surface of a beveled edge connecting a base surface to an outer edge of a plate member may have an outer width that is approximately 80-99% of the reference width.

Notwithstanding the above description of surfaces and beveled edges having defined relationships, an embodiment of the present invention may have a surface configured to shape pizza dough which is essentially a single contoured surface. For example, a base surface, a beveled edge, a cavity wall, and a cavity ceiling may all be defined by a seemingly singular surface. In one instance, a conical cavity may be provided which serves the functions of one or more of the described features. In another instance, the contact surface of a press may comprise a curved concave area defining the expansion cavity surrounded by a curved convex area comprising the base surface, the beveled or angled edge(s), or both. Additionally, each described surface or beveled edge discussed herein may be optional as the press may serve to shape a crust with a greater central thickness without certain described features being required.

The various members and components of a press system discussed herein may be formed from any appropriate material including but not limited to various types of woods, plastics, rubbers, metals, Teflon, and the like. Each component may be fabricated from the same material or each may have a unique composition in comparison to the other components. Similarly, the various members and components described herein may each be fabricated individually and then secured together or may be of one-piece construction. The press mold surface, which is in direct contact with the pliable material or dough, and in some examples the entirety of the press mold, should be selected to be food-safe and be resistant to collecting and culturing bacteria on the surface or within the press mold material. Additionally, at least the press mold surface should be non-stick to prevent the pliable material, such as a dough, from sticking to the press mold.

In an example of the present disclosure, a press or portion of the press, such as the press mold, may be sized for receipt within a pan containing a pliable material such as a dough. A pan may be any commonly available pan, such as a cake pan, pie tin, or a pizza pan, or may be specifically configured for use with a press of the present disclosure. The pan may have a flat bottom or in some examples may have a contoured interior bottom surface which contributes to the lateral movement of dough as the press is forced into the pan to squeeze the dough, as will be described below. That is, the contoured forming surface of the press may be provided within the pan, while a relatively flat plate may be pressed down upon the dough or other pliable material to form the final product. An outer wall of a pan may serve to limit the lateral movement of an outer portion of the crust and may also contribute to the formation of a raised edge crust (e.g., such as those common to deep-dish or New York style pizza). As a downward force is applied by a press on the dough in a pan, a portion of the dough may flow outward toward the wall of the pan. As additional force is applied, a portion of the dough may contact the wall of the pan and rise into a recessed portion of the press, thereby forming a raised edge crust. A first angled surface on the press mold contact surface (e.g., the bottom surface facing the dough) may be angled at a first angle $\Theta_1$ such that dough is urged at least partially inward to accumulate a thicker central portion in the expansion cavity formed by the press mold. A second angled surface, for example a surface angled at an angle $\Theta_2$, may be disposed near an outer edge of the press to assist in forcing a portion of the dough outward toward the wall of the pan to form a raised perimeter edge of the formed dough. It is noted that although a pan may assist in forming the dough, the press according to the present disclosure may be used independently on a flat surface such as a table a countertop without the use of a pan.

In another example of the present disclosure, a press system may have one or more handles. Such a handle may be disposed on a side of the press opposite the side configured to shape the dough. In some examples the handle is provided on an upper surface of the press mold, opposite the contoured contact surface on the bottom of the press mold. A handle may be any shape or size and may comprise a rod, a loop, a U-shape, etc. A handle may be secured to or removably attachable to the press to allow a user to apply a force to the press which causes the spreading or flow of dough. Such handles may also be configured to allow a user to easily retract a press in a direction away from such dough, for instance, to remove the press from a pan. It is noted that although discussed as being separate and attachable to the press mold, the present disclosure is not limited to this and the press system may include a handle integrally formed with the press mold.

Thicknesses of various components of a press may be varied. For example, an expansion cavity may have a thickness (e.g., height) of 0.1", 0.25", 0.5", 0.75", 1", or more. The expansion cavity radius may vary as well, based on the type of dough or pliable material being formed. In some examples the expansion cavity may be dome-shaped, while in other examples the radius of the expansion cavity may be between 1" and 4". The overall thickness of a press may be 0.5", 1", 1.5", 2", but the present disclosure is not limited to this. The desired style of pizza crust or other formed pliable material may help in determining the sizing of various components. In some examples, the pan may be a cake pan or pie tin which has a diameter of 11" or 7", for example, but may have substantially any diameter. As will be discussed below, the press mold may be selected to fit the desired pan shape, and the diameter of the press mold may be slightly less than the diameter of the selected cake pan to ensure that the press mold can be inserted and removed easily.

In another example of the present disclosure, a method of shaping (e.g., molding, forming, sculpting, etc.) dough into a desired contoured shape is provided. The method may include running a ball of dough through a sheeter or a press which is configured to create a uniform thickness throughout the dough. In some examples, the dough ball may only be run through the sheeter and pressed approximately 70% of its original size. This may ensure that gasses such as carbon dioxide from the fermentation and proofing process are not undesirably removed from the dough, while preparing the dough for pressing within a pan or on a flat surface by the press mold. Such a sheeter or press may be configured to yield a panel of dough with a width that is less than a desired width of a finished pizza crust. In other words, in a preferred example this step may not yield a finished pizza crust but rather may begin the process of shaping the crust leaving additional steps for completion.

Additionally, or alternatively, the dough may be hand-stretched to yield an intermediately-sized panel of dough (i.e., a width and thickness in a range between those of a rounded ball of dough and a finished crust) which will need additional shaping. In an aspect of the present disclosure, the panel of dough may then be placed into a pan or onto a support surface (e.g., table, counter-top, etc.). A press mold may be provided on an upper surface the panel of dough and a force applied in a direction of the dough to cause the press to squeeze and/or move portions of the dough into a desired shape determined at least in part by the shape of the press mold surface. In this regard, angled surfaces and/or cavities may be provided on a bottom surface portion of the press to aid in urging the dough laterally and/or vertically into a desired shape having at least two different thicknesses. In a specific example, as discussed below, the finished dough may have a thicker central or inner portion, a thinner intermediate portion between the central and edge portions, and a thicker or raised edge or perimeter portion. By leaving a thicker central portion of the dough after pressing, the dough may then be hand-stretched to the desired size for baking with a reduced or eliminated risk of tearing the dough in the process. By allowing hand-stretching after forming with the press system, the carbon dioxide and air bubbles or pockets in the dough resulting from the proofing process of the dough may be retained which may yield a fluffier, softer, and less dense baked crust with a more pleasing texture and flavor. For example, it may be preferred not to press the dough completely to a desired final diameter. This is because at least a minimum degree of air and/or carbon dioxide content is desirable in the dough to retain certain properties affecting baking, flavor, texture, etc.

As discussed above, the method may comprise hand-stretching or hand-tossing the panel of dough after removal of the press from the dough. Notably, it may be undesirable to use a press system which squeezes the dough too thin. In this regard, it may be preferred to press the dough to a certain extent (e.g., to 50-90% of the desired final unbaked pizza crust diameter) and then to finish stretching the dough by hand, as discussed above. The raised central portion may be sufficiently thick to allow for thinning, without tearing, as the dough is further stretched laterally. That is, the raised central portion may provide a reserve of excess dough which may be useful to accommodate additional stretching of the base portion of the dough. In previous systems and methods without thicker central portions, as pizza dough is stretched, the center of the panel of dough tends to thin which may lead to undesirable tearing in that region of the crust. By providing a central portion with an increased thickness prior to stretching, the stretching may cause the central portion too thin to a thickness which is effectively uniform with respect to an adjacent region of the crust, thereby resistant to tearing. The greater the thickness of the central portion prior to stretching, the more dough available to accommodate greater lateral stretching.

Numerous additional features and advantages of the present invention will become apparent to those skilled in the art upon consideration of the embodiment descriptions provided hereinbelow.

Turning now to a discussion of the drawings and various figures, examples of the present disclosure will now be discussed. With reference to FIG. 1, a press system 100 will be discussed. A press system 100 may include a press assembly 110 having a press mold 112, a handle 114, handle mounts 115, reinforcement flanges 116, an attachment plate 117. The attachment plate 117 may join or secure the handle mounts 115 to the press mold 112 by means of coupling devices 120, such as screws, nails, rivets, and the like. In some examples the handle 114 and handle mounts 115 may be selectively removable from the press mold 112. This may allow for a user to clean the press mold 112 periodically using kitchen-grade cleaning products, a dishwasher, or other cleaning and sanitization methods. In some examples, the press mold 112 may be made of Teflon, hardened plastic or other resin, wood, and the like. In a preferred example, the press mold 112 may be made of a Teflon formulation which is corrosion resistant and dishwasher safe, to enable safe cleaning and sanitation. Teflon may also provide improved strength and rigidity while keeping the weight of the press mold 112 relatively low. Teflon materials may also be selected to be inherently resistant to capture and culturing bacteria on their surface or in the bulk of the material, while advantageously being non-stick. By reducing the amount of dough or pliable material which sticks to the press mold 112, the finished product may be more consistently formed with fewer defects, while also reducing the need to clean the press mold 112 surface.

The assembled press assembly may include a handle 114 provided through one or more apertures 118 in the handle mounts 115. A set screw 122 may secure the handle 114 in the apertures 118 and may help prevent the handle 114 from rotating within the apertures 118 of the handle mounts 115. The handle 114 may in some examples be shaped in a substantially tubular or cylindrical form. In some examples the handle 114 may be a hollow tubular pipe sized to provide a gripping portion on either side of the handle mounts 115, as illustrated in FIGS. 1-5. In other examples, the handle 114 may be ergonomically formed to include holding portions for a user to comfortably grip the handle 114 while applying a force to press a dough.

The press system 100 may further include a pan 170 such as a cake pan, pie tin, or pizza pan. The pan 170 may be provided, as will be discussed below, to hold an unformed dough ball therein and to assist with forming the pressed dough crust, such as a pizza crust or a pie crust. The pan 170 may have a diameter which is selected to form a pressed and formed dough sheet suitable for subsequent hand-stretching.

In some examples, the pan 170 may have a diameter of 7", 11", or other standard size, and may aid in forming a pressed dough crust which can be hand-stretched to a crust size of 10", 16", and the like. It is noted that the present disclosure is not limited in this manner, and substantially any size pan and finished crust diameter may be used. The press assembly 110 may be sized with a diameter according to the desired pan diameter, but in preferred examples the press mold 112 may have a diameter slightly less than the diameter of the pan 170. By providing a gap, such as gap 130 in FIG. 5, the press assembly 110 may be provided in the interior compartment of the pan 170, while not becoming wedged in the pan 170 or otherwise difficult to remove. Furthermore, by providing a small gap 130, which may in some examples be 0.25", 0.125", 0.1", 0.0625", or less, the press mold 112 may be properly centered within the pan 170 and ensure proper forming of the dough. The gap 130 may be sized to aid in reducing the amount of dough which is urged past an upper surface of the press mold 112, which would potentially lead to a malformed edge of the dough crust.

Figure 2:
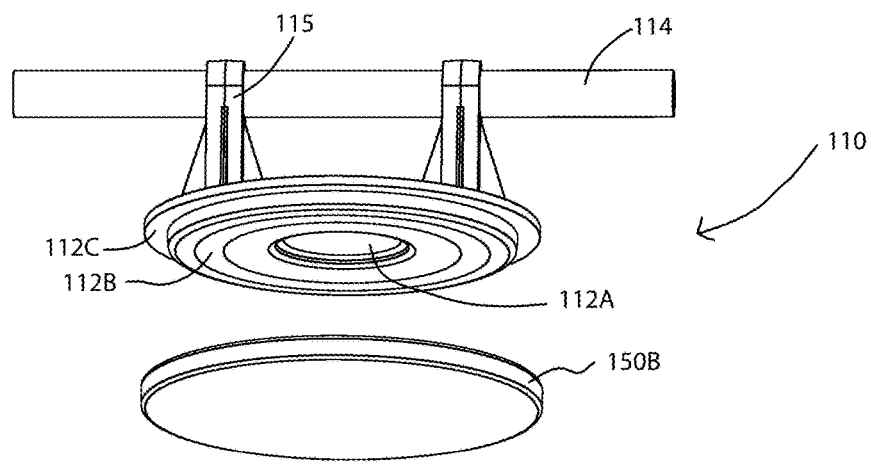
FIG. 2 is a bottom perspective view of a portion of the press assembly of FIG. 1.
Figure 3:
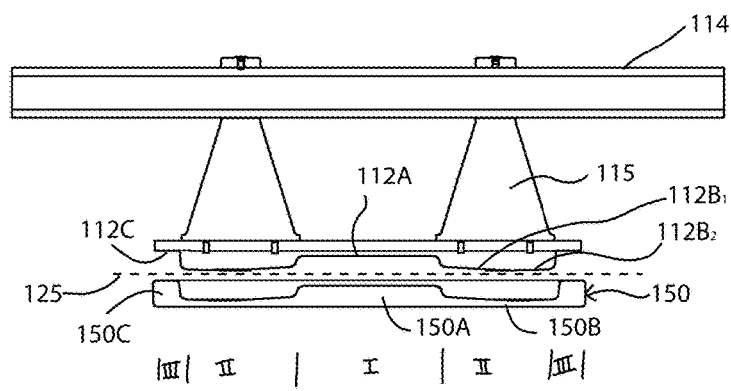
FIG. 3 is a cross-sectional side view of the press assembly of FIGS. 1 and 2.
Figure 4:
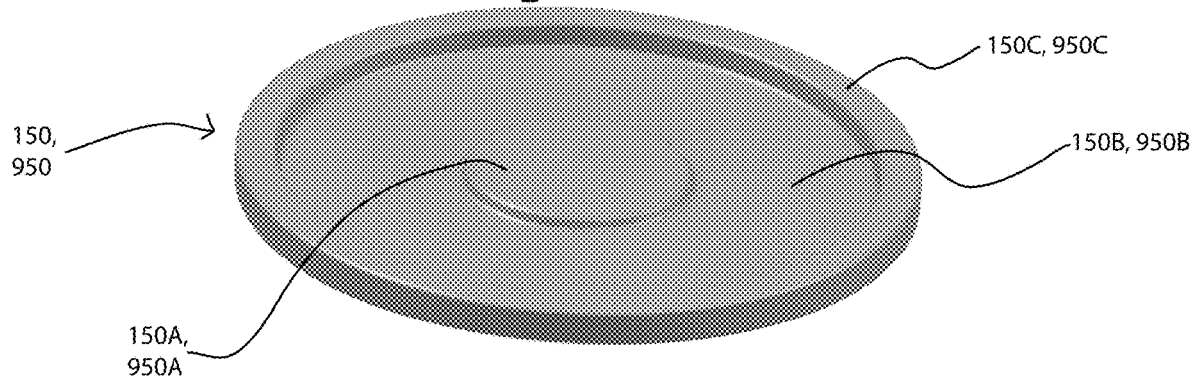
FIG. 4 is a perspective view of a pizza crust formed by the press system of FIGS. 1-3.

FIGS. 2-4 illustrate various other views of the press system 100 of FIG. 1. FIG. 2 illustrates a bottom perspective view of the press assembly 110 and a formed pizza crust 150 formed of unbaked dough. Although the present example is discussed with reference to forming a pizza crust 150, the present disclosure is not limited to this and the press assembly 110 may be used to press, form, and prepare several types of pliable materials, as discussed above. In this example, a pizza crust 150 is formed by applying pressure on the press assembly 110 such that the press mold 112 impinges on an unformed dough ball 146 (FIG. 5A) to form the pizza crust 150.

As illustrated in FIGS. 2 and 3, the press mold 112 includes several distinct sections provided for ensuring the final form of the pizza crust 150 includes the desired shape. That is, as discussed above, it may be desirable to have a pizza crust 150 formed with a thick center portion and a raised edge or outer portion, and with an intermediate section at least relatively thin compared with the central and edge portions. Accordingly, as illustrated in FIGS. 2 and 3, the press mold 112 may include a recessed central portion 112A, a thicker raised portion 112B, and a recessed portion 112C. The raised portion 112B, as discussed above, may include one or more angled surfaces $112B_1$ and $112B_2$ which are inclined with respect to a horizontal axis 125 by angles $\Theta_1$, $\Theta_2$, respectively (see also FIG. 5D). The recessed central portion 112A may form the expansion cavity discussed above and allow for the dough to accumulate in the cavity formed by the central portion 112A of the press mold 112.

With reference to FIG. 3, a cross-sectional view of the press assembly 110 is shown as sectioned along line A-A in FIG. 1. The pizza crust 150 is also illustrated in cross-sectional form to demonstrate some of the features of the present disclosure. In particular, the crust 150 may be formed by the press mold 112 of the press assembly 110 to include three distinct regions I, II, and III. In region I, the central portion 150A of the pizza crust 150 is thicker and includes an accumulated amount of dough therein compared with regions II and III. This thicker central portion 150A may be provided to allow for hand-stretching of the crust 150 after the pizza crust 150 has been pressed into shape by the press mold 112 of the press assembly 110. An intermediate portion 150B of the pizza crust 150, corresponding to region II, may be relatively thin compared with the thicker central portion 150A. The edge portion 150C of the pizza crust 150, corresponding to region III, may again be thicker to form a raised edge of the pizza crust 150.

It is noted that the angled surface $112B_1$ and $112B_2$ of the press mold 112 are selected and designed to form the pizza crust 150 with these distinct regions I-III. That is, an angled surface $112B_1$, which is inclined at an angle $\Theta_1$ with respect to the horizontal axis 125, may be provided radially inward with respect to the angled surface $112B_2$, which is inclined at an angle $\Theta_2$ with respect to horizontal axis 125 and provided radially outward (i.e., toward an edge portion 112C). In some examples, $\Theta_1$ may be a smaller angle than the angle $\Theta_2$. In other examples the angles $\Theta_1$, $\Theta_2$ may be substantially the same or equal. In still other examples, angle $\Theta_1$ may be larger than angle $\Theta_2$. However, in a preferred example, $\Theta_1$ is smaller than the angle $\Theta_2$ such than angled surface $112B_1$ is formed with a shallower angle than angled surface $112B_2$, as illustrated in FIGS. 2, 3, and 5D. In some examples, angles for $\Theta_1$, $\Theta_2$ may be selected to be between 3° and 45°, or in some examples between 5° and 20°, based on the type of pliable material or elasticity of the dough (e.g., based on the moisture content or amount of proofing of the dough). A perimeter recessed portion 112C of the press mold 112 may be provided to allow for dough which has been pressed radially outward from the center of the press mold 112 to accumulate and form a raised edge 150C of the pizza crust 150, which corresponds to region III of the pizza crust 150.

FIG. 4 is a perspective view of a formed pizza crust 150 after the press assembly 110 has been applied to it. As discussed above, the pizza crust 150 may have a thicker central portion 150A, a thinner intermediate portion 150B, and a thicker edge portion 150C which are formed by the press mold 112 as described above. The thicker central portion 150A is designed to allow for hand stretching of the pizza crust 150 to its desired final size, while minimizing or eliminating undesirable thinning or tearing of the pizza crust 150.

Figure 5A:
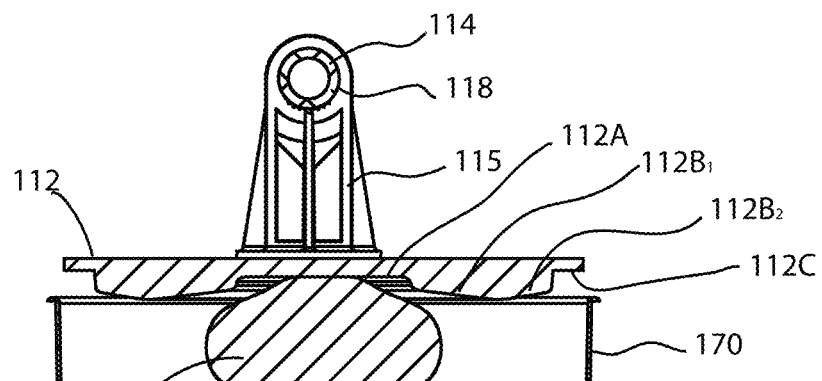
FIGS. 5A-5C are cross-sectional side views of the press system of FIGS. 1-3.
Figure 5B:
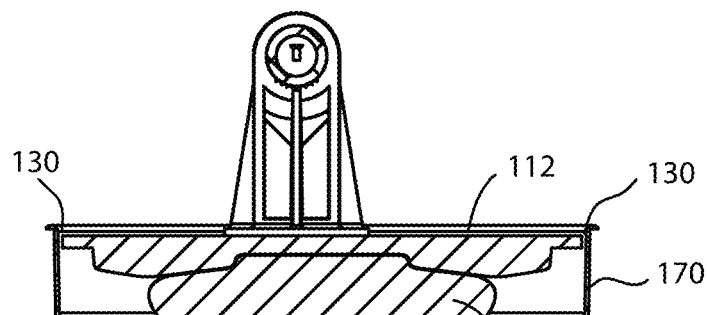
Figure 5C:
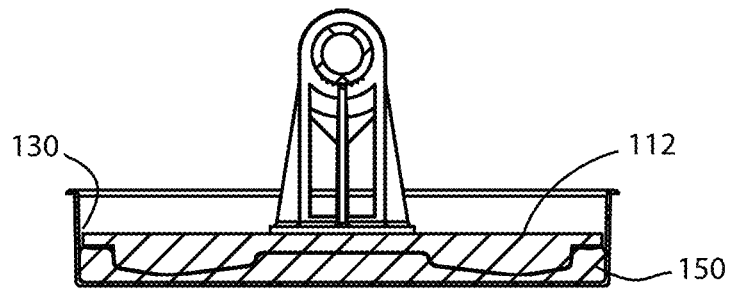
Figure 5D:
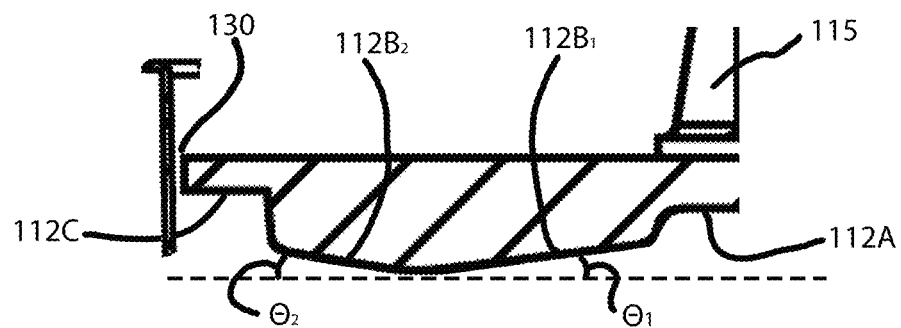
FIG. 5D is a partial enlarged view of a portion of the press system of FIGS. 1-3.

With reference to FIGS. 5A-5C, the pressing operation of a dough ball 146 to form a pizza crust 150 will be discussed. A proofed dough ball 146 may be provided in a pan 170 and preferably centered therein. As discussed above, the pan 170 maybe a cake pan, a pie tin, and the like. The press assembly 110 including the press mold 112 may then be applied to the dough ball 146. As pressure is applied by a user to the handle 114, the press mold 112 forces the dough ball 146 to begin taking on the shape of the press mold 112 surface 112A-112C. In particular, a central recess 112A begin acting on the dough ball 146 until it impinges on the angled surfaces $112B_1$, $112B_2$. Angled surface $112B_1$ may urge a portion of the dough ball 146 radially inward toward a center of the press mold 112 such that the dough ball 146 begins to fill the recess (e.g., the expansion cavity) formed by the central portion 112A. Although discussed above as beginning with a dough ball 146 as illustrated in FIG. 5A, the present disclosure is not limited to this. In some examples, a dough ball 146 may be partially flattened into a sheet having a greater thickness than the final pizza crust 150 thickness. In some examples, a dough sheet such as the dough 146 in FIG. 5B may be the starting shape of the dough when a press is applied.

As the press assembly 110 and press mold 112 are forced further downward, as illustrated in FIG. 5B, the expansion cavity may be filled with dough and the dough ball 146 may be further deformed and forced radially outward from a central portion. At this point, the angled surface $112B_2$ of the press mold 112 may begin to act upon the dough ball 146 to continue pushing the dough 146 radially outward from the center of the press mold 112. It is noted that the angled surface $112B_1$ may be designed to aid in urging the dough ball 146 to fill the recess and expansion cavity formed by the central portion 112A, while the angled surface 112B$_2$ may be designed to urge a portion of the dough ball 146 to spread laterally or radially outward toward an edge of the pan 170 or an edge of the press mold 112. It is noted that in some examples, during the process of applying force to the press assembly 110, a user may "rock" the press assembly 110 back and forth to help in forming and urging the dough ball 146 to take the shape of the press mold 112. Finally, as seen in FIG. 5C, the dough ball 146 has been forced to deform and fill the recessed edge portion formed by the recessed portion 112C of the press mold 112.

As illustrated in FIG. 5C, the dough ball 146 has been full pressed to fill the region between the press mold 112 and the pan 170 forms the pizza crust 150 as discussed above and illustrated in FIG. 4. As discussed above, the gap 130 may allow for the press mold 112 to easily slide in the opening of the pan 170 without becoming wedged, while also providing a centering guide for the press mold 112 within the pan 170. FIG. 5D is an enlarged isolated view of a portion of the press mold 112 showing the angled surfaces 112B$_1$, 112B$_2$ and the angles $\Theta_1$, $\Theta_2$ formed by the angled surfaces with respect to a horizontal axis 125.

Figure 6:
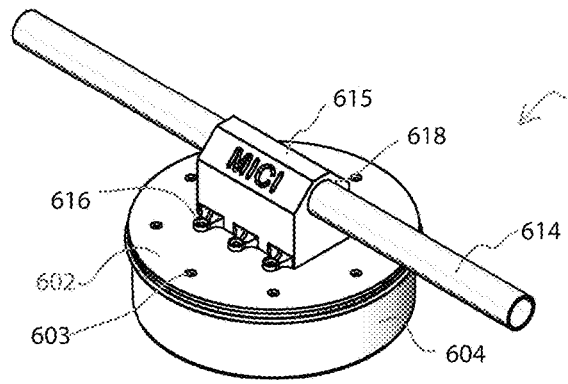
FIG. 6 is a perspective view of a press system according to a second example.
Figure 7:
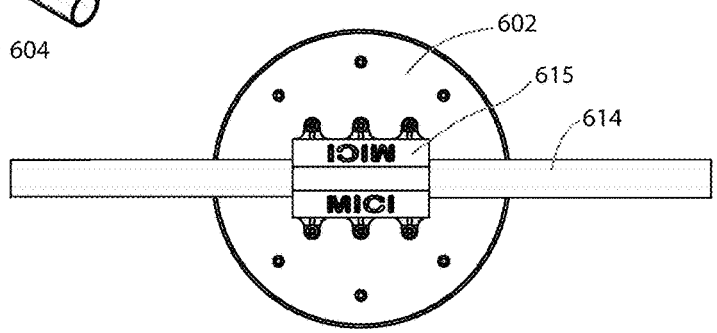
FIG. 7 is a top view of the press system of FIG. 6.

With reference now to FIGS. 6-8, another example of a press system will be discussed. Press system 600 may be operated in substantially the same way as press system 100 discussed above. The press system 600 includes a press assembly 610 having a handle 614 provided in an aperture 618 of a handle mount 615. The handle mount 615 may be secured to a backing plate 602 by attachment mechanisms 616, such as screws, nails, rivets, and the like. The backing plate 602 may be made of a light weight but rigid material such as metal, reinforced plastic, and the like. In one example the backing plate 602 is made of light-weight aluminum.

The backing plate 602 may be secured to a standoff 604 by attachment mechanisms 603, such as screws, nails, rivets, and the like. The standoff 604 may be made of a light weight, inexpensive material such a wood or plastic. In some examples the standoff 604 is made of wood. On a side opposite the backing plate 602, a press mold 606 may be secured to the standoff 604 by attachment mechanisms 607, which may be screws, nails, rivets, and the like. As discussed above with respect to press mold 112, in some examples the press mold 606 may be made of light-weight Teflon, reinforced plastic or other resin, wood, and the like. In a preferred example, the press mold 606 may be made of a Teflon formulation which is corrosion resistant and dishwasher safe, to enable safe cleaning and sanitation. Teflon may also provide improved strength and rigidity while keeping the weight of the press mold 606 low. Teflon materials may also be selected to be inherently resistant to capture and culturing bacteria on their surface or in the bulk of the material, while advantageously being non-stick.

Figure 8A:
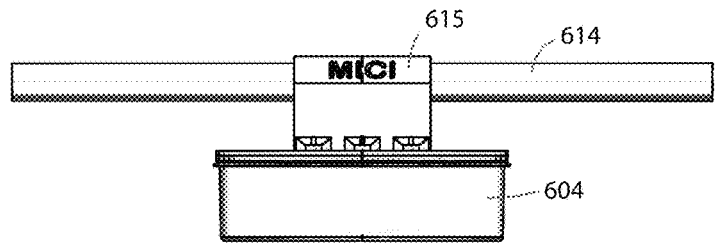
FIG. 8A is a side view of the press system of FIGS. 6-7.

As illustrated in FIG. 8A, the press mold 606 maybe selectively removed from the press assembly 610. By allowing the press mold 606 to be removed from the press assembly 610, the press mold 606 may be made thinner, smaller, and/or lighter while also allowing for easy cleaning and sanitization of the dough contact surface. The thinner press mold 606 may also reduce the cost of the overall press assembly 610 as the press mold 606 may be made of a more rigid and more expensive light-weight material, while other components of the press assembly 610 may be made of less-expensive materials such as wood. In some examples, the standoff 604 may be selected to provide additional weight to the press assembly 610, which may help a user apply an appropriate amount of force to a dough ball (not shown) to help form the pizza crust 150. In some examples, the separable or removable press mold 606 may be interchanged with press molds 606 having a slightly different shape or design, such as angled surfaces 606B$_1$, 606B$_2$ with different angles $\Theta_1$, $\Theta_2$, respectively. The different molds 606 may be provided to accommodate different dough elasticities and consistencies, such as doughs having different moisture contents or proofing times.

Figure 8B:
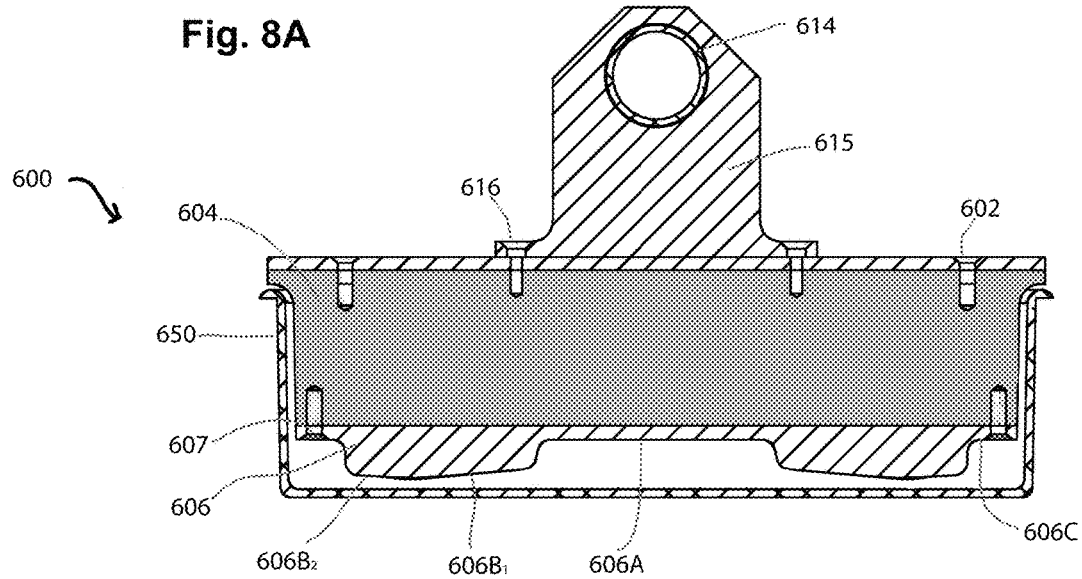
FIG. 8B is a cross-sectional side view of the press system of FIGS. 6-8A.

As illustrated in FIG. 8B, and similar to the press mold 112 discussed above, the press assembly 610 may be designed to fit within a pan 650. A dough ball (not shown) may be provided in the pan 650 and the press assembly 610 may be applied thereto to begin forming the dough ball into a pizza crust 150. Similar to the press mold 112, the press mold 606 may include a recessed central portion 606A which forms an expansion cavity for receiving a bulk of dough therein. The press mold 606 includes angled surfaces 606B$_1$ and 606B$_2$ which are inclined from a horizontal axis 625 by angles $\Theta_1$, $\Theta_2$ respectively. As discussed above with respect to the press mold 112 of FIGS. 1-5, angled surfaces 606B$_1$ and 606B$_2$ may aid in urging a dough ball to fill an expansion cavity formed by the recessed central portion 606A as well as fill in the edge region formed by recessed portion 606C. The recessed portion 606C of the press mold 606 may aid in forming the edge portion 150C of the pizza crust 150.

Figures 9A, 9B:
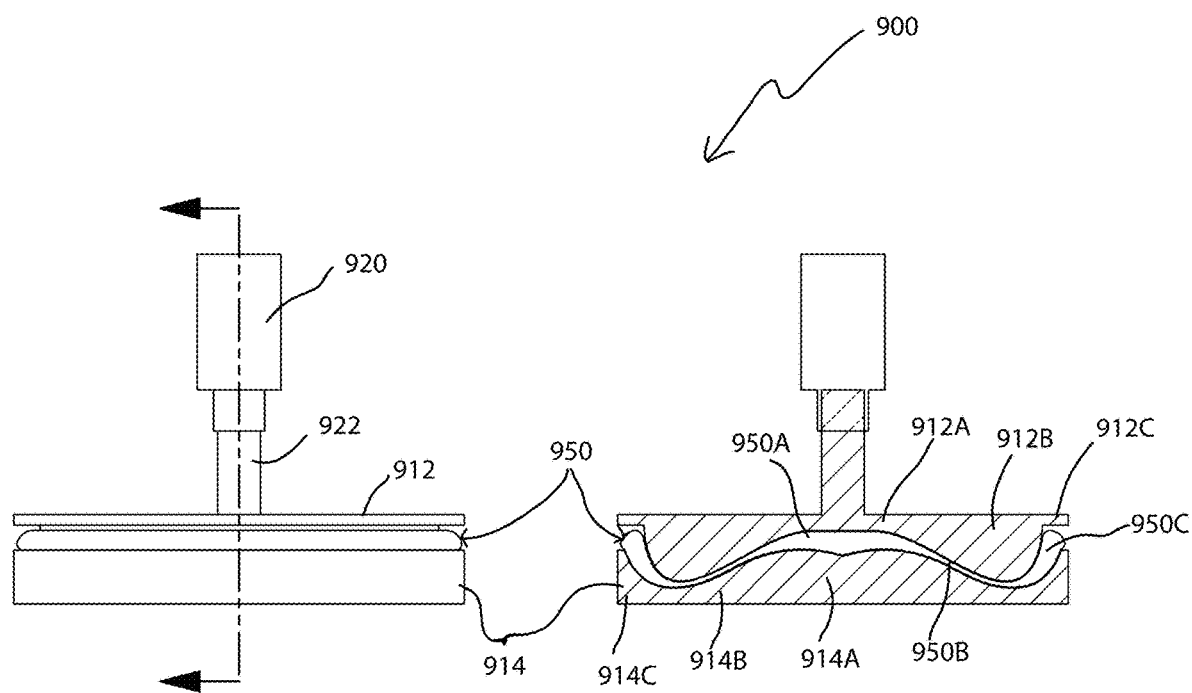
FIG. 9A is a side view of a press system according to a third example.
FIG. 9B is a cross-sectional side view of the press system of FIG. 9A.

With reference to FIGS. 9A-9B, another example of a press assembly according to the present disclosure will be discussed. Press system 900 may include an automatic press 920. In some examples the automatic press 920 may include a hydraulic press, a screw-press, or other powered press. The automatic press 920 may include a piston 922 coupled to or integral with an upper press mold 912. In this example, the press mold may include an upper press mold 912 and a lower press mold 914. The upper press mold 912 may include a recessed or concave central portion 912A corresponding to a convex central portion 914A of the lower press mold 914. In some examples the convex central portion 914A of the lower press mold 914 may include a centering notch 915 in a center of the central portion 914A. The centering notch 915 may aid in ensuring that a dough ball (not shown) is centered within the upper and lower press molds 912, 914. Together, the concave central portion 912A of the upper mold 912 and the convex central portion 914A of the lower mold 914 may together form the thicker central portion of the pizza crust 950. In some examples the pizza crust 950 may be shaped, when formed by the press system 900, substantially similar to the pizza crust 150 discussed above.

The upper press mold 912 may also include a thicker convex portion 912B which corresponds to a thinner concave portion 914B of the lower press mold 914. Together the convex portion 912B and concave portion 914B may provide a thinner intermediate portion 950B of the pizza crust 950. The upper press mold 912 may also include a recessed portion 912C corresponding to a protruding portion 914C of the lower press mold 914. Together, the recessed portion 912C and the protruding portion 914C may together form the raised edge portion 950C of the pizza crust 950. In some examples the upper mold 912 and lower mold 914 may be formed with surfaces having sharper angles or more exaggerated curvature as compared with the press molds 112, 606 discussed above. This may aid in quickly and effectively forming the pizza crust 950.

It is noted that although illustrated with a press mold having an upper press mold 912 and a lower press mold 914, the automatic press system 900 is not limited to this. Press molds 112, 606 of the press assemblies 110, 610, respectively, may be used with automatic press 920 and piston 922. By providing an automatic press 920, the process of forming pizza crusts 150, 950 may be quicker and utilize less manual labor than the press systems 100, 600. In some examples, the automatic press 920 may enable mass production of pizza crusts 150, 950 which are intended for hand-stretching at a later time by an end user, consumer, and the like. In some examples, the automatic press system 900 may prepare a mass-produced pizza crust 150 which allows an end user to hand-stretch the crust 150 when preparing a home-made pizza. This may facilitate a more enjoyable and authentic pizza making experience for the consumer, while providing a baked pizza crust with a lighter, fluffier consistency and raised edge similar to what you would get at a restaurant with professional pizza preparers.

Figure 10:
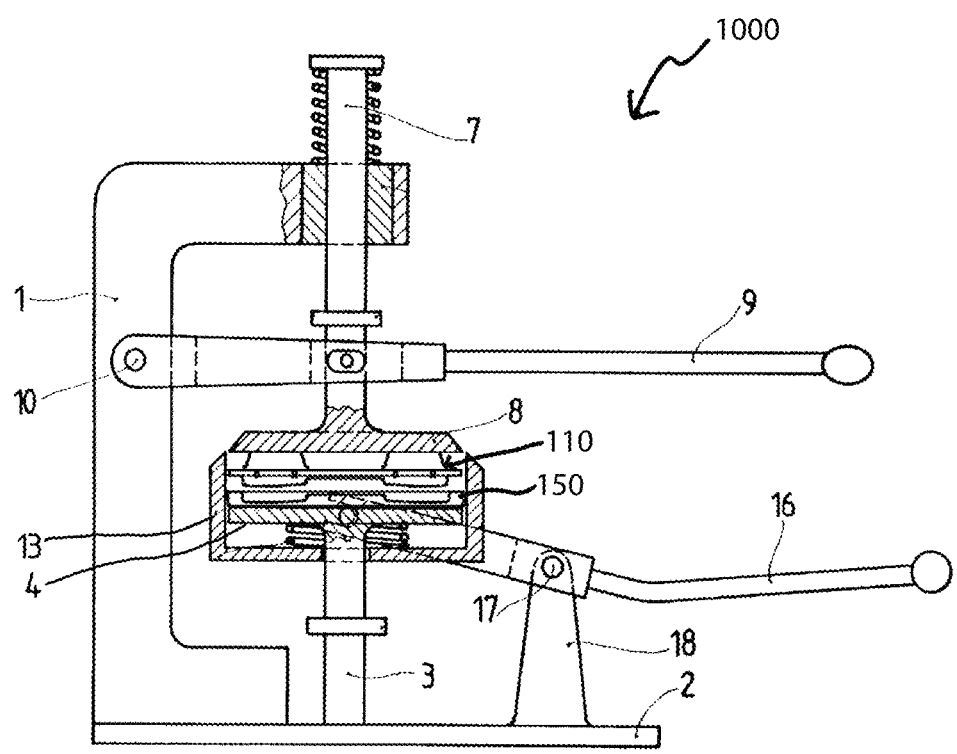
FIG. 10 is a partial cross-sectional side view of a press system according to a fourth example.

With reference now to FIG. 10, another example of a press system 1000 will be discussed. The press system 1000 may be a mechanically-assisted system which is human powered but provides mechanical advantage to allow a larger force to be applied to a dough ball (not shown) by the press assembly 110 to form a pizza crust 150. In particular, the press system 1000 may include a first and second lever arms 9, 16 for operation by a user. The press system 1000 may include a stand 1, a base 2, and a support 18. First lever arm 9 may pivot around a pin 10 coupled to the stand 1 and act on a piston 7 to provide a linear downward force on piston 7. A backing plate 8 may be coupled to the bottom of piston 7, and a press assembly 110 may be secured to the backing plate 8.

A pan 13 may be provided which receives a dough ball which the press assembly 110 forms into a pizza crust 150. The dough ball, and resulting pizza crust 150, may be supported by a lower plate 4. In some examples, a second lever arm 16 may be pivotally coupled to the support 18 by a pin 17 and may be coupled to the lower plate 4. A lower piston 3 may be coupled to the lower plate 4 and be moved linearly upward by the action of the second lever arm 16.

Accordingly, a pizza crust 150 may be formed by operation of the press system 1000 by manually actuating the first lever arm 9 and/or the second lever arm 16. In particular, the press assembly 110 may be coupled to a backing plate 8. A dough ball (not shown) may be placed on the lower plate 4 within the pan 13 and centered under the press assembly 110. A user may operate one or both of the first lever arm 9 and the second lever arm 16. The first and second lever arms 9, 16 include long arms which pivot around pins 10 and 17, respectively. This allows for a larger force to be transmitted to the backing plate 8 and/or the lower plate 4 than if a user were to directly press on the press assembly 110. Accordingly, the press system 1000 may be useful for users who are not sufficiently strong and/or cannot apply the appropriate amount of force to the press assembly 110 to properly form the pizza crust 150.

It is noted that although discussed above as being used in combination with a press assembly 110, the press system 1000 is not limited to this. Press assembly 610 or the upper and lower press molds 912, 914 may also be used with the press system 1000 to enable manually-activated, mechanically-assisted forming of a pizza crust 150, 950. Furthermore, the press systems 100, 600, 900, 1000 may include interchangeable press molds to allow for pressing of different dough consistencies and elasticities, such as doughs which have various moisture contents or which have been proofed for various lengths of time. Additionally, although not illustrated in the drawings, the press molds may include one or more convex dimples protruding from the press surface (e.g., the bottom surface of the press mold) and extending into the dough. These dimples may be provided radially, azimuthally, and/or perimetrically on the press mold surface. In some examples, a plurality of dimples may be provided, for example, around a perimeter of the press mold angled surface (e.g., angled surface $112B_2$, angled surface $112B_1$, or both). In other examples, the dimples may be provided on substantially the entire press mold surface. Dimples may be of various sizes and shapes, and in some examples may be convex shaped, hemispheres, geodesically shaped, and the like. The dimples may simulate kneading with fingers and may aid in spreading the dough to the desired shape and size.

All directional references (e.g., proximal, distal, upper, lower, upward, downward, left, right, lateral, longitudinal, front, back, top, bottom, above, below, vertical, horizontal, radial, axial, clockwise, and counterclockwise) are only used for identification purposes to aid the reader's understanding of the present disclosure, examples and embodiments, and do not create limitations, particularly as to the position, orientation, or use of the invention. Connection references (e.g., attached, coupled, connected, and joined) are to be construed broadly and may include intermediate members between a collection of elements and relative movement between elements unless otherwise indicated. As such, connection references do not necessarily infer that two elements are directly connected and in fixed relation to each other. The exemplary drawings are for purposes of illustration only and the dimensions, positions, order and relative sizes reflected in the drawings attached hereto may vary.

The above specification, examples and data provide a complete description of the structure and use of exemplary embodiments of the invention as defined in the claims. Although various embodiments of the claimed invention have been described above with a certain degree of particularity, or with reference to one or more individual embodiments, those skilled in the art could make numerous alterations to the disclosed embodiments without departing from the spirit or scope of the claimed invention. Other embodiments are therefore contemplated. It is intended that all matter contained in the above description and shown in the accompanying drawings shall be interpreted as illustrative only of particular embodiments and not limiting. Changes in detail or structure may be made without departing from the basic elements of the invention as defined in the following claims.

What is claimed is:

1. A press system configured for pressing a dough, comprising:
    a press assembly comprising a press mold comprising a central portion having a first dimension, an edge portion having a second dimension, and an intermediate portion having a third dimension and comprising a first angled surface and a second angled surface, wherein the first angled surface is inclined at a first angle with respect to a horizontal plane and the second angled surface is inclined at a second angle with respect to the horizontal plane;
    an expansion cavity defined by the central portion configured to receive at least a portion of the pliable material when the press system impinges the dough;
    wherein the intermediate portion is provided radially between the central portion and the edge portion, and the third dimension is greater than the first and second dimensions.

2. A press system according to claim 1, wherein the first angle is between 3 degrees and 45 degrees and the second angle is between 3 degrees and 45 degrees.

3. A press system according to claim 1, wherein the first angled surface is provided proximate the central portion and the second angle surface, is provided radially outward of the first angled surface.

4. A press system according to claim 3, wherein the first angled surface and the second angled surface form a continuous press surface in the intermediate portion of the press mold.

5. A press system according to claim 1, further comprising:
a handle;
one or more handle mounts coupled to the handle and the press mold and configured to secure the handle to the press mold.

6. A press system according to claim 1, wherein the press mold is selectively removable from the press assembly.

7. A press system according to claim 1, further comprising:
a pan configured to receive the dough and having a first lateral dimension;
wherein the press mold includes a second lateral dimension, the second lateral dimension being smaller than the first lateral dimension to form a gap between the pan and the press mold when a press mold is provided in the pan.

8. A press system according to claim 7, wherein the press mold is provided in the pan.

9. A press system according to claim 1, further comprising piston and an automatic press.

10. A press system according to claim 9, wherein the automatic press is hydraulically or electrically actuated and configured impart a linear displacement on the piston.

11. A press system according to claim 9, wherein the piston is coupled to the press mold and is configured to impart linear displacement on the press mold.

12. A press system according to claim 1, wherein the press system is configured to form a pizza crust from the dough, the pizza crust including a central portion having a first thickness, an intermediate portion having a second thickness, and an edge portion having a third thickness, wherein the first and third thicknesses are greater than the second thickness.

13. A press system according to claim 12, wherein the central portion is configured to enable hand-stretching of the pizza crust while reducing tearing.

14. A press system according to claim 1, wherein the first and second angles are selected based on a moisture content and/or a proofing time of the dough.

15. A method of molding a dough using a press assembly, comprising:
placing the dough in a pan;
placing the press assembly into the pan, wherein the dough is disposed between a bottom interior surface of the pan and the press assembly, the press assembly comprising a press mold including a first angled surface inclined at a first angle, a second angled surface inclined at a second angle, wherein the first and second angled surfaces are provided at an intermediate portion between a central portion and an edge portion of the press mold;
applying a force to the press assembly in the direction of the bottom interior surface, wherein the application of force causes the first angled surface to force a portion of the dough toward an expansion cavity provided at the central portion of the press mold;
retracting the press assembly from the pan, wherein the dough has a first thickness at a central portion that is greater than a second thickness of an adjacent portion circumscribing the central portion after retracting the press assembly.

16. The method of claim 15, further comprising:
pre-shaping the ball of dough using a flat press, a sheeter, or hand-stretching to create a substantially uniform thickness prior to placing the dough in the pan.

17. The method of claim 15, further comprising:
hand-stretching the dough after removing the dough from the pan to create a substantially uniform thickness across a base of a pizza crust.

18. The method of claim 15, wherein the press assembly is manually operated.

19. The method of claim 15, wherein the press assembly is automatically operated.

* * * * *